(12) United States Patent
Gopal et al.

(10) Patent No.: US 8,533,246 B2
(45) Date of Patent: Sep. 10, 2013

(54) CARRY BUCKET-AWARE MULTIPLICATION HAVING BITS WITH MOST SIGNIFICANT BITS SET TO ZERO

(75) Inventors: Vinodh Gopal, Westborough, MA (US); Michael Kounavis, Hillsboro, OR (US); Arun Raghunath, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1069 days.

(21) Appl. No.: 12/334,230

(22) Filed: Dec. 12, 2008

(65) Prior Publication Data
US 2010/0153830 A1    Jun. 17, 2010

(51) Int. Cl.
G06F 11/00    (2006.01)
G06F 7/52     (2006.01)
G06F 5/01     (2006.01)
G06F 7/00     (2006.01)
G06F 7/44     (2006.01)

(52) U.S. Cl.
USPC ........... 708/209; 708/200; 708/210; 708/503; 714/809; 714/E11.006

(58) Field of Classification Search
USPC .................................. 708/200, 209
See application file for complete search history.

(56) References Cited

U.S. PATENT DOCUMENTS 5,825,679 A * 10/1998 Wolrich et al. ............. 708/628
2008/0005209 A1 * 1/2008 Kounavis et al. ............ 708/200

OTHER PUBLICATIONS

Ragnunath et al., "Carry-Bucket Aware Multiplcation", Technical Report, 2 pages.
Raghunath et al., "Efficient Carry Propagation Using Carry Buckets", 3 pages.

* cited by examiner

*Primary Examiner* — Tammara Peyton
(74) *Attorney, Agent, or Firm* — Grossman, Tucker, Perreault & Pfleger, PLLC (57) ABSTRACT

An apparatus comprising an integrated circuit configured to accept a plurality of operands; multiply the operands producing an result in a first binary format; and distribute the result in the first binary format over a plurality of data units in a second binary format, each unit having W bits with k>0 most significant bits set to zero.

17 Claims, 7 Drawing Sheets

Generalized Floating-Point Multiplier

FIG. 4

Generalized Carry Bucket Aware Multiplier

CARRY BUCKET-AWARE MULTIPLICATION HAVING BITS WITH MOST SIGNIFICANT BITS SET TO ZERO

BACKGROUND

This description relates to carry bucket-aware hardware multiplication.

Very large numbers can be represented using multiple data units, for example a 420 digit number can be represented using fourteen 32-bit words. In general, adding two such numbers requires propagating carries from one word to the next. Multiplication of such large numbers using conventional approaches (e.g., "long multiplication") may incur many such carry propagations during accumulation of partial sums.

DESCRIPTION

Figure 1:
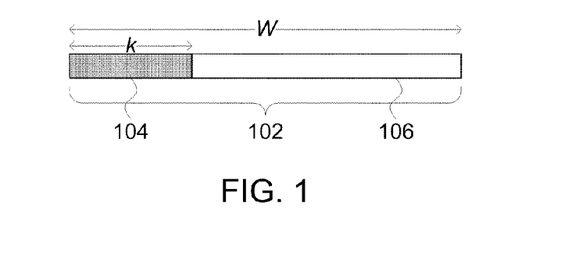
FIG. 1 is a block diagram of a register.

Carry bucket arithmetic can be used to improve efficiency when performing arithmetic computations with large numbers that are represented using multiple data units. For example, a 420 bit (binary digit) number may be represented as fifteen 28-bit portions each stored in separate units. A "carry bucket" is a leading block of high order bits of a data unit reserved for carry overflow during intermediate computations, with the remaining bits of the data unit being used for a content region. Referring to FIG. 1, a register 102 has a word size W. The register is divided into a carry bucket 104 of size k and a content region 106 of size W−k. The size (k) of the carry bucket 104 is selected, for example, as a function of the overflow anticipated during intermediate computations. For example, in performing a summation, k can be set to the base 2 logarithm of the maximum number of additions in the summation. Generally, the size k is selected to ensure that the overflow resulting from the component operations is limited to the carry bucket and the component operations will not overflow the size of the data unit as a whole. For example, 28-bit content stored in a 32-bit word enables $2^4$ (sixteen) such numbers to be added without overflowing the 32-bit register.

Figure 2:
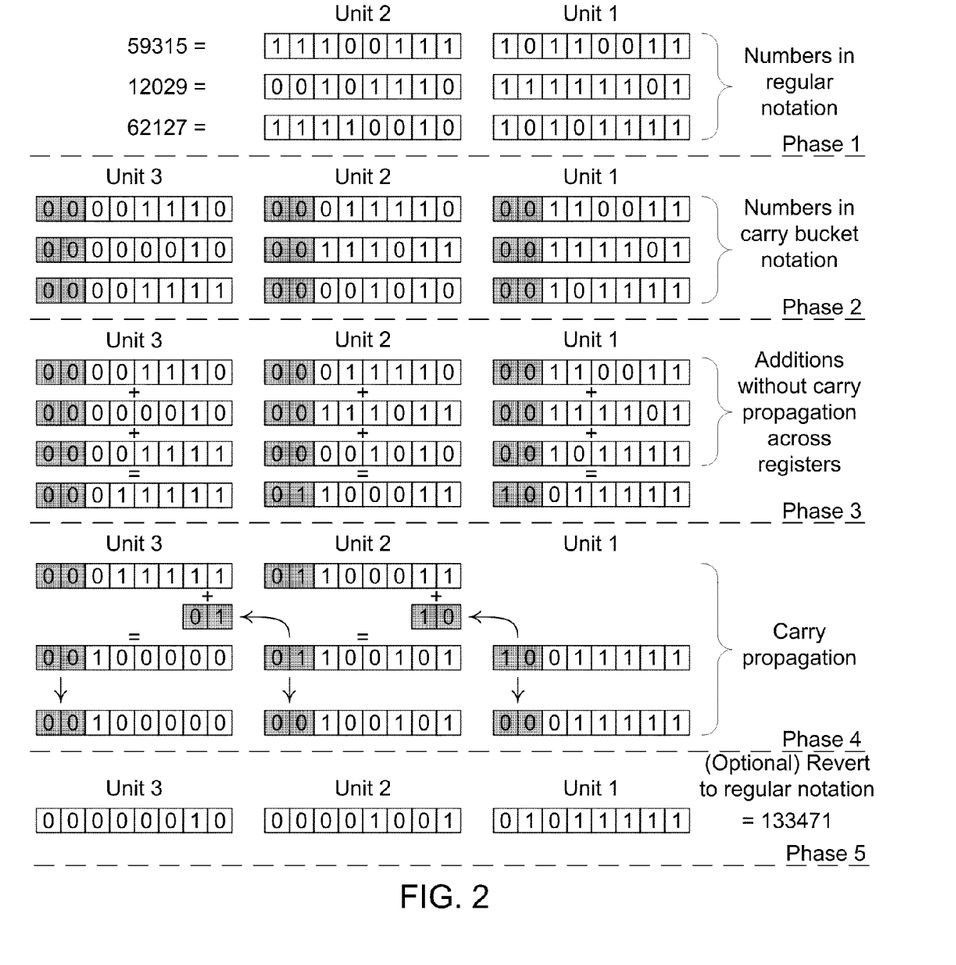
FIG. 2 is a diagram that illustrates summation using carry buckets.

Referring to FIG. 2, the use of carry buckets is demonstrated by an example involving summing three numbers, each of which can be represented using three units in a carry bucket format. When represented using two 8-bit words without carry bucket format, adding the binary representations of the decimal numbers 59,315, 12,029, and 62,127 (as shown in FIG. 2), incurs carries from one word to the next on a number of the word-level addition. Using carry buckets (with W=8, k=2 in the example) each set of three W-size units can be added independently with no overflow between units, with carries between the independently added sets being performed only after each set of units are added. This allows the summation of different parts of the representation to be performed in parallel because there is no carry between the different parts at each addition. Once all the sets are added, the carry bucket bits are propagated from data unit to data unit leaving the carry buckets zeroed in the final result.

In an example where the original operands are represented using data units without carry buckets (e.g., as two 8-bit words), summation using carry buckets begins by converting input operands into carry bucket format. For example, as shown in FIG. 2, large numbers represented in two 8-bit units (phase 1) are converted into carry bucket format (phase 2) using three 8-bit units. The k most significant bits are extracted from each lower unit of a large number and placed (e.g., shifted) into the least significant bit positions of the next higher unit. The bits of the next unit are shifted to the left for a number of bit positions equal to the carry bucket size to make room for the new bits that are inserted. The k most significant bits of the lower unit are then set to zero, establishing an empty carry bucket. This process is repeated for all units of a large number.

With the numbers in carry bucket format, corresponding units are added to one another without carries needing to be propagated across units (phase 3 in FIG. 2). The carries generated during these dependent additions are accumulated into the carry buckets. The carry buckets are sized to prevent overflow. Carry propagation takes place once all dependent additions are complete (phase 4 in FIG. 2). Carry propagation is performed by adding the bits of the carry bucket for each lower unit to the next higher unit. The carry bucket for each unit is then set back to zero. This process is repeated for each successively higher order unit of a large number. In some instances, the units are then converted back to a conventional binary format (phase 5 in FIG. 2).

In some examples, when performing a sequence of arithmetic operations using large numbers, it is convenient to keep the numbers in carry bucket format. This avoids having to repeatedly convert between conventional binary and carry bucket formats.

In some examples, arithmetic operations using multiple-unit representations are implemented in software. For example, the process illustrated in FIG. 2 is implemented using conventional machine instructions, such as conventional shift, mask, and add instructions.

In some examples, arithmetic operations using multiple-unit representations are implemented in hardware and/or as special machine instructions. For example, hardware that implements arithmetic operations, such as multiplication hardware, is configured to accept inputs in carry bucket format, and to produce outputs in carry bucket format. An example of such hardware is combinatorial or clocked logic circuitry that implements the calculation. In some examples, a processor includes an instruction set that includes instructions that operate on and/or produce results that are in carry bucket format. For example, a microprocessor may support a multiplication instruction that makes use of a carry bucket aware hardware multiplier.

In an example of a carry bucket aware multiplier, the multiplier accepts two carry bucket format operands, multiplies the operands, and provides the result in carry bucket format. Note that, in general, multiplication of an m-bit operand by an n-bit operand produces an m times n bit result. For example, multiplication of two data units, each with (W−k) bits of content, will at most require 2(W−k) bits to represent the result. Using carry bucket format, the result is represented in two data W-bit units, each with the high-order k-bits zeroed as a carry bucket.

Figure 3A:
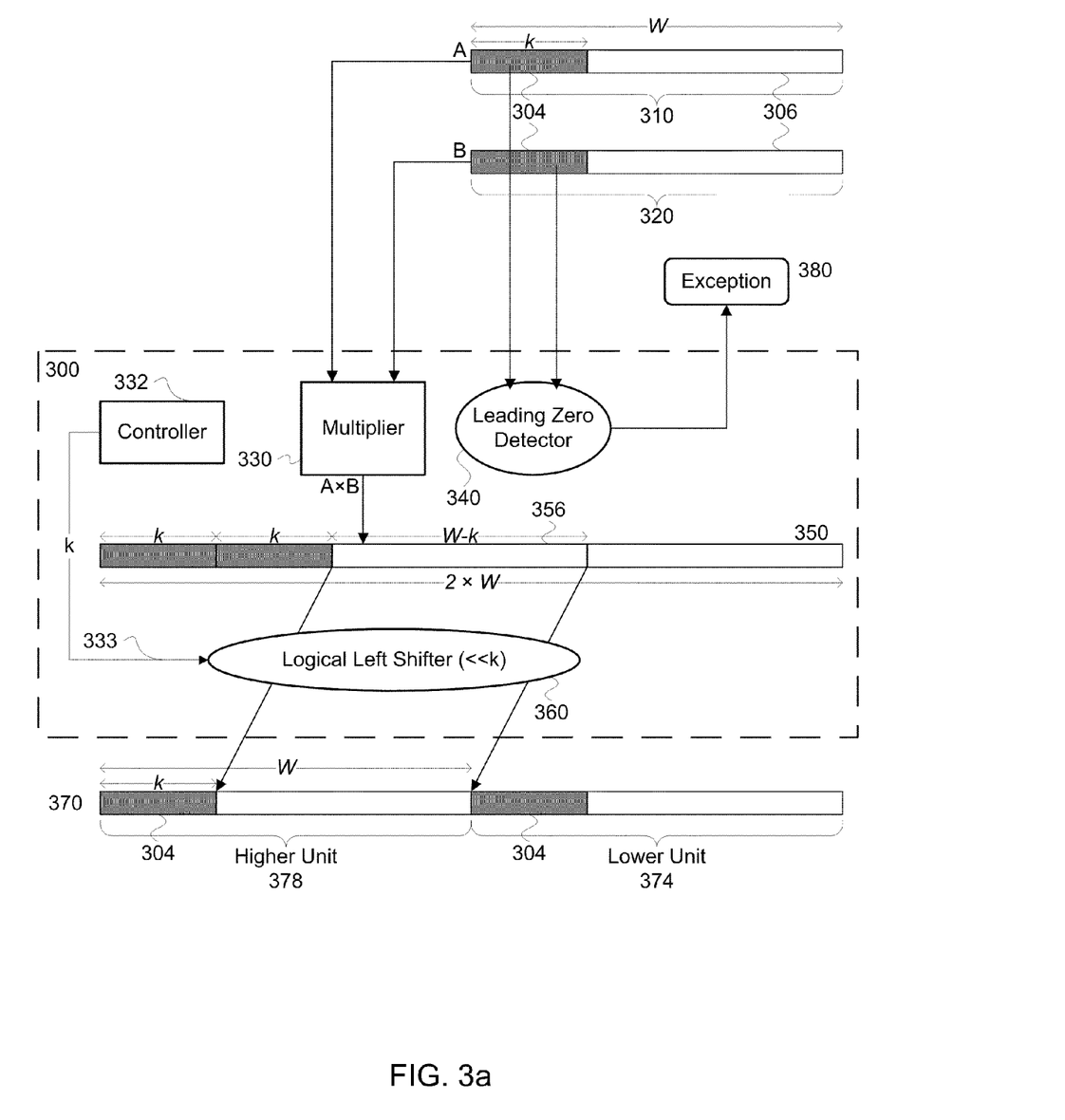
FIGS. 3a and 3b are block diagrams of a carry bucket aware multiplier.
Figure 6:
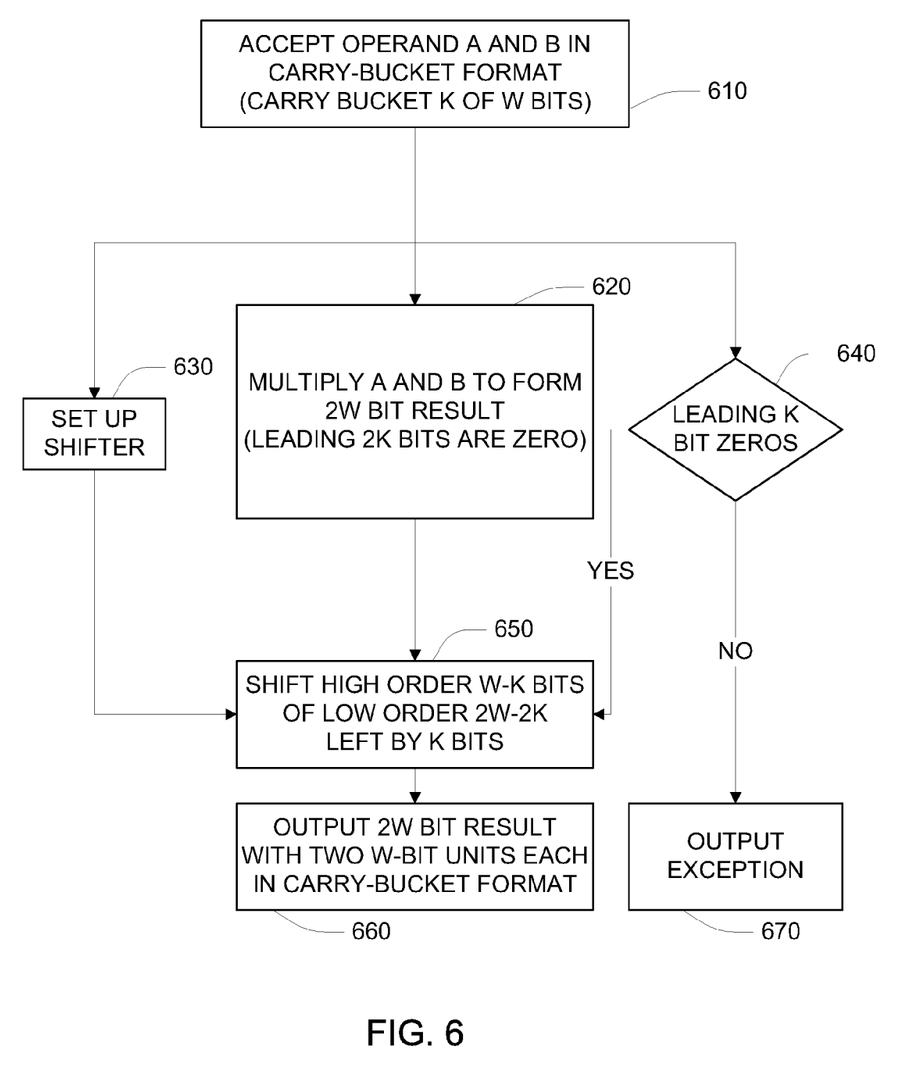
FIG. 6 is a flowchart that illustrates operation of a carry bucket aware multiplier.

Referring to FIG. 3a, with reference to the flowchart shown in FIG. 6, a carry-bucket-aware multiplier 300 accepts operands A 310 and B 320, both of size W and both in carry bucket format, having a carry bucket 304 of size k (e.g., with all zero bits) and a content portion 306 of size W−k (block 610). The operands are multiplied by conventional binary multiplier 330 producing result 350 (block 620). The higher order 2k bits of the result are zero (assuming the high order k bits of each operand are zero) because they represent the multiplication of the zeroed carry buckets, and the low order 2W−2k hold the content of the multiplication. In some implementations a W by W bit multiplier 330 (e.g., W=64) and k<=10 is used. In some implementations, the multiplier handles less than W-bit operands (but at least W−k bits), as the k most significant bits of the operands can be assumed to be zero producing 2k zero bits in the product. A bit shifter 360 accepts the result 350 from the multiplier 330 to produce the carry-bucket format output 370 with two units 374 and 378 (block 650). The shifter 370 shifts the highest W−k bits 356 of the 2W−2k bit content left by k bits creating a carry bucket format representation 370 with high order unit 378 in carry bucket format with a zeroed carry bucket 304 and with a low order unit 374 also in carry bucket format with a zeroed carry bucket 304.

In some implementations, the value of k is provided to the carry-bucket-aware multiplier 300 as an input. In some implementations, the value of k is hardwired in the multiplier or is otherwise preconfigured in the multiplier (e.g., in circuitry or in a configuration register).

In some implementations, the value of k is used by a Leading Zero Detector ("LZD") 340 to verify the number of leading-zeros in the operands, ensuring that the operand carry buckets are zeroed (block 640). If either operand has non-zeros in the top k most significant bits, the carry-bucket-aware multiplier 300 outputs an exception condition 380 (block 670). Note that the LZD 340 can operate in parallel with the multiplier 330.

There is also, in parallel with the multiplier 330, sufficient time for a controller 332 to setup the shifter 360 to perform the logical left-shift by k on initial result 350 (block 630). Since the datapath is wide and the value of k is relatively small, the actual data flow through the shifter is very fast (e.g., if implemented using pass-gate transistors forming analog switches through which the data is shifted or using short paths through combinatorial logic) compared to the setup time of the control. The control lines 333 only depend on k and can thus be setup very fast, in parallel with the multiplier 330, creating minimal delay overhead to the path.

In some implementations, the carry-bucket-aware multiplier 300 is also used to perform non-carry-bucket multiplications. In some implementations, setting k=0 is sufficient, as this eliminates shifting within the output 350 of the multiplier 330. In some implementations an additional signal (e.g., a mode bit) is used to distinguish between carry-bucket and non-carry-bucket operation modes.

Figure 3B:
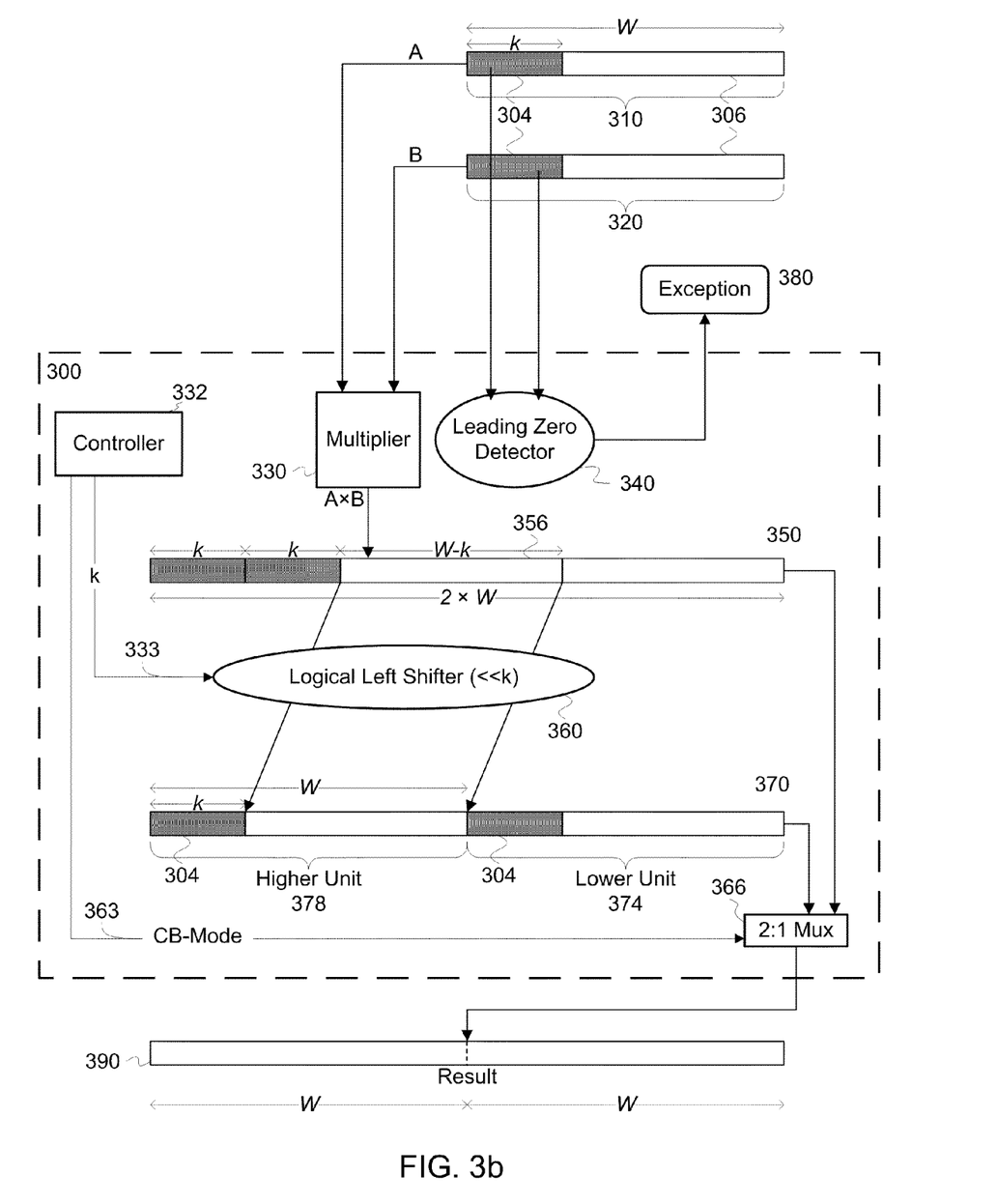

Referring to FIG. 3b, in some implementations, a variant of the carry-aware multiplier 300 includes a multiplexer 366 that accepts a control input 363 indicating whether multiplier is being used in carry bucket mode. If the control input 363 indicates that the carry-bucket mode is being used, the multiplexer selects the carry-bucket format output 370. If a non-carry-bucket mode is being used, the multiplexer selects the unmodified output 350 of the multiplier 330. The output of the multiplexer is then the result 390 in the selected form.

Figure 4:
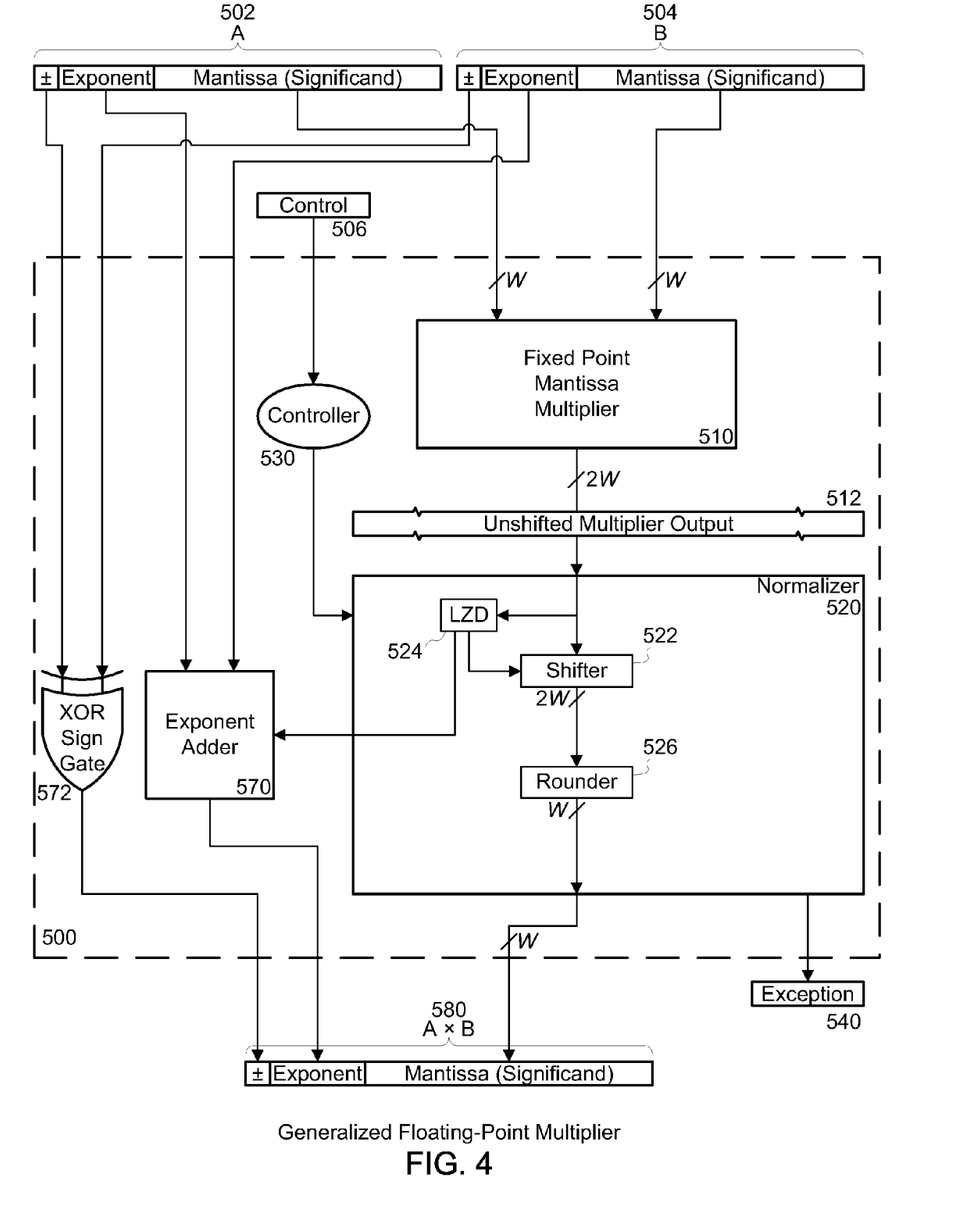
FIG. 4 is a block diagram of a multiplier configured in a floating-point mode.
Figure 5:
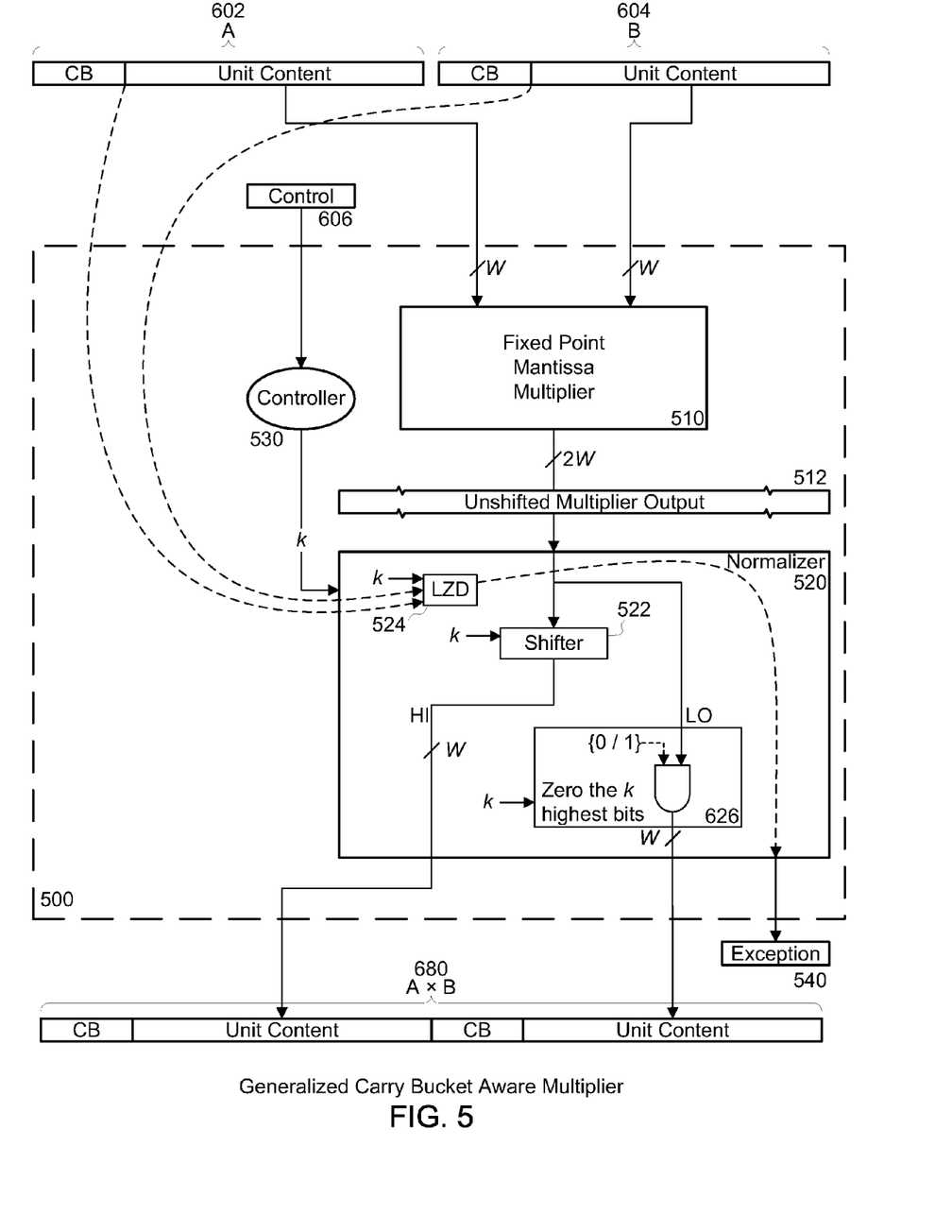
FIG. 5 is a block diagram of a multiplier configured in a carry-bucket mode.

Referring to FIGS. 4 and 5, in some implementations, a configurable multiplier 500 is configurable to either perform multiplication of binary representations of floating point numbers or to perform multiplication of binary representations of integers in carry bucket format as a single instruction. Referring to FIG. 4, the configurable multiplier 500 is shown configured as a generalized floating point multiplier, which takes as inputs two floating point operands A 502 and B 504. The multiplier also takes in control information 506, for example, in the form of configuration bits stored in a special register. An integer multiplier 510 multiplies the mantissa portion of the floating point representations and produces an intermediary output 512. This intermediary output is then processed by a normalizer 520 to produce the mantissa of the result 580. The normalizer 520 is configured by controller 530 to handle the type of floating point format being processed. A leading zero detector (LZD) 524 determines the number of bits to shift the output. A shifter 522 performs the shift and a rounder 526 reduces the result to fit in the mantissa space allotted for the floating point format. If an error occurs (e.g., underflow or overflow) then the normalizer triggers an exception 540. The exponents of the operands 502 and 504 are added by an adder 570, which also makes any adjustment for the shift determined by the LZD 524. The sign bits are processed by an exclusive OR logic gate 572. The results are combined to form a floating point representation of A×B 580.

Referring to FIG. 5, the configurable multiplier 500 is shown configured to perform carry-bucket-aware integer multiplication, using a number of portions of the multiplier that are also used for the floating point multiplication as shown in FIG. 4. The multiplier takes as inputs two carry-bucket format integer operands A 602 and B 604. The multiplier also takes in control information 606 (e.g., the value of k), for example, in the form of configuration bits stored in a special register. Note that as configured for carry-bucket multiplication, the multiplier makes use of the integer multiplier 510 and shifter 522 that are used for floating point multiplication. The LZD 524 is also used, although at a different point in the process. Whereas in floating-point mode it is used to control the amount by which the shifter 522 shifts the result, in the carry-bucket mode it is used to verify that the operands have properly zeroed carry buckets. This error detection is optional.

In the carry-bucket mode, the normalizer 520 is controlled in a similar manner as in the floating point mode according to a specification of the carry bucket size, k. Note that when using the multiplier in normal integer multiplication mode (not carry bucket mode) the value of k is 0. Operands A 602 and B 604 are again multiplied by the integer multiplier 510 producing an intermediary output 512.

The output 680 of the carry bucket mode normalizer 520 is produced by selecting the correct bits from the shifted and unshifted versions of the intermediary output 512. The high order unit of the result is the high order of the shifted result. The low order unit of the result is low order of the unshifted intermediary output 512 passed through a bit-mask 626 to zero-out the carry bucket.

For example, the shifter 522 is a 128-bit shifter that can shift left by up to 128 bits (Shifted[127:0]=Intermediate[127:0]<<shiftvalue), then for the carry bucket adjustment, shiftvalue is k (Shifted[127:0]=Intermediate[127:0]<<k). Shifted[127:0] and Intermediate[127:0] are then used to determine the result:

Result[127:64]=Shifted[127:64]

Result[63:63−k+1]=0

Result[63−k:0]=Intermediate[63−k:0]

In some examples, an instruction processor, such as a general purpose processor or a special-purpose processor is controlled by machine instructions, with the machine instructions including instructions specifying that a carry-bucket-aware multiplication is to be performed by the processor. In some implementations, the processor includes circuitry to perform the carry-aware multiplication, for example, of a type shown in FIG. 3 or FIGS. 4-5. In other implementations, execution of the carry-bucket machine instructions may be internally implemented in microcode, using a combination of microcode and special-purpose circuitry, using an internal instruction translation into an instruction set that does not include carry-bucket specific instructions, or other approaches to implementing a computer instruction processor.

Examples of computer instructions that implement carry-bucket aware arithmetic operations include the following:

CB-Multiply RA, RB, k—multiply the contents of register RA and register RB, both of which are in carry-bucket format with k bit carry buckets, to form a result in combined registers RA:RB, with the each register representing one unit of the two unit result.
  In some examples, the value of k is not explicit, but is set by a control instruction, such as
CB-size k—set carry bucker control value to k.
  In some examples, other computer instructions also include addition instructions, and format conversion instructions, such as
CB-Carry RA, RB, k—add the carry bucket of register RA to RB and zero the carry bucket of RA.
CB-Convert RA, RB, k—convert a conventional binary format integer in RA:RB into two registers, each in carry bucket format.

In some examples, the design of circuit elements described above, for example, a carry-bucket aware multiplier, or a computer processor for processing carry-bucket aware instructions, is provided in computer-readable form (e.g., on a computer-readable disk) as a specification of a circuit element (e.g., as layout instructions or data that controls the layout of a circuit core, or as Verilog or VHDL specifications) that can be incorporated into the design of an integrated circuit.

In some examples, carry-bucket aware multipliers are used for security algorithms such as RSA or Diffie Hellman, which include use of multiprecision arithmetic. For example, a special-purpose cryptographic processor can include a hardware carry-bucket aware multiplier. For example, modular exponentiation is performed in these algorithms by first converting all (or at least some) of the operands into carry-bucket format. Then, sequences of operations, which include multiplication of units of multiple precision format integers, are performed using carry bucket format numbers. The multiplication of such numbers is performed for example using a carry-bucket aware multiplier of a type described above. In some examples, after the modular exponentiation, the results are converted back into conventional multiple precision format, which does not include carry buckets in each unit of the multiple precision format. In some examples, multiplication using the Karatsuba multiplication algorithm on numbers represented in carry bucket format units is accelerated by avoiding conversion overhead through use of a carry bucket aware multiplier. The carry bucket format can also be used in implementation of Montgomery/Barret reduction algorithms.

Figure 7:
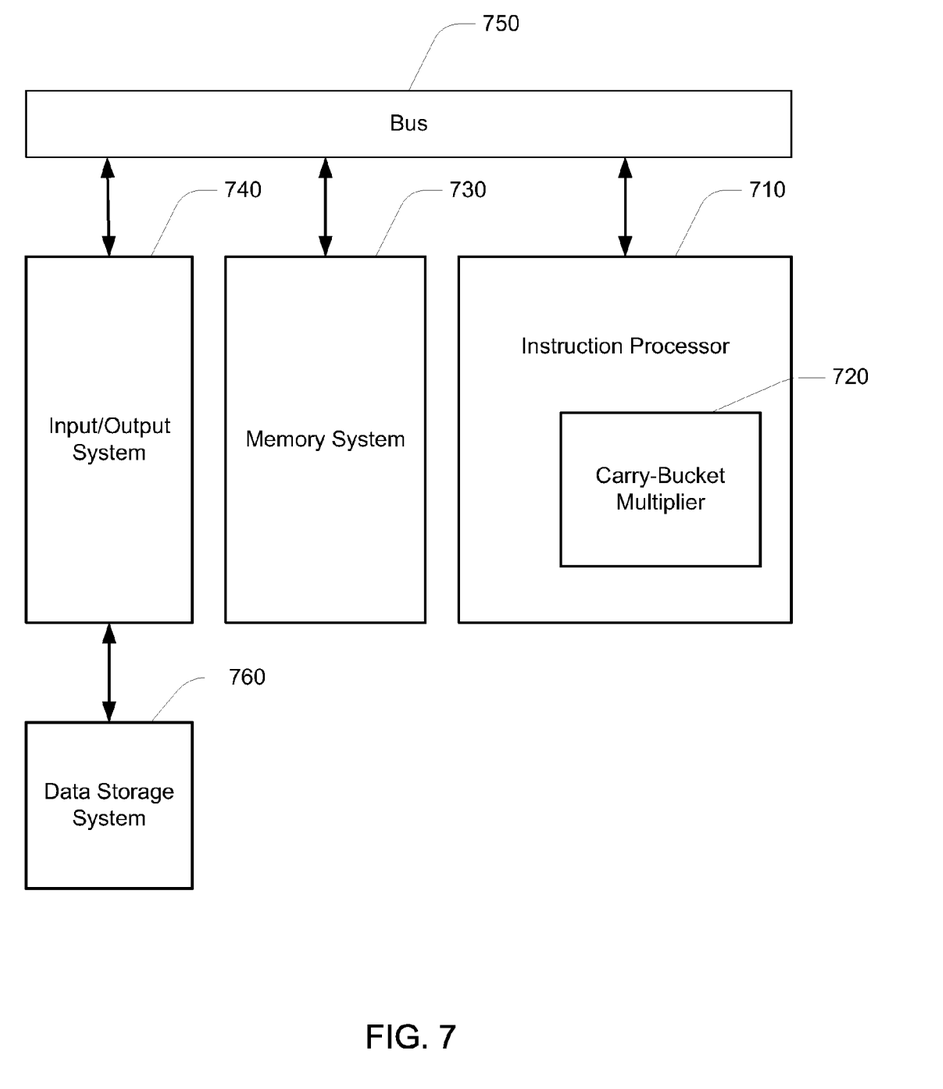
FIG. 7 is a block diagram of a system that includes a processor incorporating a carry-bucket aware multiplier.

Referring to FIG. 7, in some examples, a processor 710 that includes an integrated carry-bucket aware multiplier 720 is used in a computing system that includes a memory system 730 and an input/output system 740 coupled by a bus 750. The input/output system 740 may be coupled to a storage system 760, which can include a storage device, for example, a disk drive, Digital Video Disk (DVD) drive, Compact Disk (CD) drive, Redundant Array of Independent Disks (RAID), tape drive or other storage device. In some examples, the processor 710 is a general-purpose processor that processes instructions that make use of the multiplier 720 to multiply data stored in the memory system 730. In some examples, the processor is a cryptographic processor, which receives encrypted data from the memory system and uses the multiplier 720 in performing cryptographic functions using the data received from the memory system.

Approaches described in this specification may be implemented in digital electronic circuitry, including special-purpose logic circuitry, and circuitry embedded in a computer processor. Circuit elements may be represented on computer-readable media (or embodied on a propagating carrier in a medium), for example, as instructions or data structures that drive design of an integrated circuit that includes those circuit elements. Computer processors that support instruction and/or operations described in this specification can implement the instructions and/or operations using logic circuitry, or using software (for example, firmware or microcode), or using a combination thereof. It is to be understood that the foregoing description is intended to illustrate and not to limit the scope of the invention, which is defined by the scope of the appended claims. Other embodiments are within the scope of the following claims.

What is claimed is:

1. A method comprising:
  accepting a plurality of operands at a carry-bucket-aware multiplier;
  multiplying, using the carry-bucket-aware multiplier, the operands producing a result in a first binary format stored in computer readable memory; and
  distributing, using data shifting circuitry, the result in the first binary format over a plurality of data units in a second binary format stored in computer readable memory, each unit having W bits with k>0 most significant bits set to zero, by shifting at least part of the intermediate result by k bits towards the most significant bit.

2. The method of claim 1, wherein:
  accepting a plurality of operands includes accepting said operands in the second binary format, each operand having W bits and using the least significant W−k bits to represent a value of the operand.

3. The method of claim 1, further comprising:
  detecting zeroes in the most significant k bits of each operand; and
  indicating an error if the operands do not each have the k most significant bits set to zero.

4. The method of claim 1, further comprising:
  accepting a control signal representing the value k.

5. The method of claim 4, further comprising:
  storing the value of k.

6. The method of claim 1, wherein:
each of the plurality of operands has W bits, and the result of the multiplying of the operands has 2W bits.

7. The method of claim 1, wherein the plurality of data units in a second binary format include a high order data unit and a low order data unit, and wherein distributing the result in the first format over a plurality of data units comprises:
selecting a number of least significant bits from the result in the first format for use in the low-order data unit, the number of bits being between W and W−k;
setting the k most significant bits of the low-order data unit to zero;
shifting the result in the first format forming a shifted result with the k most significant bits set to zero; and
selecting the W most significant bits of the shifted result for the high order data unit.

8. An apparatus comprising:
an arithmetic unit comprising a carry-bucket-aware multiplier configured to compute an arithmetic product of at least part of each of two numeric operands; and
a shift unit for shifting at least part of the arithmetic product by k bits towards the most significant bit to form at least part of a numeric result stored in computer readable memory;
wherein in at least one operating mode, the apparatus is configured to provide the numeric result as two data units, each data unit having W bits with k>0 most significant bits set to zero, and together the W−k bits of each data unit representing a value of the numeric result;
wherein in at least a second operating mode, the apparatus is configured accept the operands in a floating point format and to provide the numeric result in a floating point format; and
wherein the shift unit is configurable such that in the first operating mode, the shift unit is configured to distribute the arithmetic result over the two data units, each unit having W bits with k>0 most significant bits set to zero, and in the second operating mode the shift unit is configured to normalize a mantissa of the numeric result.

9. An instruction processor configured to execute instructions, the instructions including:
one or more instructions each specifying a source of each of a plurality of numeric operands and a destination for a result of an arithmetic multiplication on said operands;
wherein execution of each of said instructions by the processor causes the arithmetic result of the arithmetic multiplication to be distributed over a plurality of data units stored at the specified destination, each data unit having W bits with k>0 most significant bits set to zero and using the least significant W−k bits of the data units to represent a value of the arithmetic result, by shifting at least part of the intermediate result by k bits towards the most significant bit.

10. The instruction processor of claim 9 wherein at least some of the one or more instructions further specify a value for k.

11. The instruction processor of claim 9 wherein the instructions further include an instruction for setting a control value to k, said control value affecting operation of at least some subsequent instructions.

12. The instruction processor of claim 9 wherein at least some of the one or more instructions specify a source of each of the operands as a W-bit register, and specify a destination as a set of W-bit registers, each register for storing a corresponding one of the data units.

13. The instruction processor of claim 9 wherein the instructions further include an instruction specifying a source holding a numeric value and a destination for setting a control value to k, said control value affecting operation of at least some subsequent instructions.

14. An article of manufacture including machine accessible media having associated information, wherein the information, when accessed, results in a machine forming a specification of an integrated circuit that includes circuitry configured to:
accept a plurality of operands;
multiply the operands producing an result in a first binary format; and
distribute the result in the first binary format over a plurality of data units in a second binary format, each unit having W bits with k>0 most significant bits set to zero, by shifting at least part of the intermediate result by k bits towards the most significant bit.

15. A system comprising:
an instruction processor comprising a multiplier configured to accept a plurality of operands, multiply the operands producing an result in a first binary format, and distribute the result in the first binary format over a plurality of data units in a second binary format, each unit having W bits with k>0 most significant bits set to zero, by shifting at least part of the intermediate result by k bits towards the most significant bit; and
a data storage system to store the plurality of operands.

16. The system of claim 15 wherein the data storage system comprises a disk-based storage system.

17. A method comprising:
accepting a plurality of operands at a carry-bucket-aware multiplier;
multiplying, using the carry-bucket-aware multiplier, the operands producing a result in a first binary format stored in computer readable memory; and
distributing, using data shifting circuitry, the result in the first binary format over a plurality of data units in a second binary format stored in computer readable memory, each unit having W bits with k>0 most significant bits set to zero;
wherein the plurality of data units in a second binary format include a high order data unit and a low order data unit, and wherein distributing the result in the first format over a plurality of data units comprises:
selecting a number of least significant bits from the result in the first format for use in the low-order data unit, the number of bits being between W and W−k;
setting the k most significant bits of the low-order data unit to zero;
shifting the result in the first format forming a shifted result with the k most significant bits set to zero; and
selecting the W most significant bits of the shifted result for the high order data unit.

* * * * *